United States Patent
Gallege et al.

(10) Patent No.: US 11,988,274 B2
(45) Date of Patent: May 21, 2024

(54) PASSIVE GEARBOX LUBRICATION SYSTEM WITH A SECONDARY SUMP

(71) Applicant: Cummins Inc., Columbus, IN (US)

(72) Inventors: Nuwan Janaka Gallege, Columbus, IN (US); Neil Graham McNab, Kenilworth (GB)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 18/104,708

(22) Filed: Feb. 1, 2023

(65) Prior Publication Data

US 2023/0279944 A1 Sep. 7, 2023

Related U.S. Application Data

(60) Provisional application No. 63/315,321, filed on Mar. 1, 2022.

(51) Int. Cl.
*F16H 57/04* (2010.01)
*F16H 1/08* (2006.01)

(52) U.S. Cl.
CPC .......... *F16H 57/0457* (2013.01); *F16H 1/08* (2013.01); *F16H 57/0424* (2013.01); *F16H 57/043* (2013.01); *F16H 57/045* (2013.01); *F16H 57/0465* (2013.01); *F16H 57/0471* (2013.01); *F16H 57/0495* (2013.01)

(58) Field of Classification Search
CPC . F16H 57/0424; F16H 57/0423; F16H 57/045
See application file for complete search history.

(56) References Cited

U.S. PATENT DOCUMENTS

| | | | |
|---|---|---|---|
| 3,887,037 A * | 6/1975 | Haluda | ............ F16N 7/14 184/6.12 |
| 6,964,320 B2 | 11/2005 | Metelues et al. | |
| 10,711,877 B2 | 7/2020 | Fisher et al. | |
| 2010/0144480 A1 * | 6/2010 | Downs | ............ F16H 57/0483 475/160 |

(Continued)

FOREIGN PATENT DOCUMENTS

| CN | 102494115 A | 6/2012 |
|---|---|---|
| CN | 209511086 U | 10/2019 |

(Continued)

*Primary Examiner* — Jake Cook
(74) *Attorney, Agent, or Firm* — Faegre Drinker Biddle & Reath LLP

(57) ABSTRACT

A passive lubrication system for lubricating components of a gearbox is provided. The passive lubrication system includes a first sump, formed in a housing of the gearbox, for holding a lubricant fluid for lubricating components of the gearbox and a second sump formed in the housing of the gearbox, the second sump for capturing lubricant fluid displaced, by rotation of the gear wheel, from the first sump, the second sump having one or more openings for directing lubricant fluid captured in the second sump to the one or more components of the single speed drive system to provide lubrication to the one or more components of the single speed drive system. The passive lubrication system also includes a channel formed in the housing of the gearbox, the channel for channeling lubricant fluid, displaced by rotation of the gear wheel, from the first sump to the second sump.

20 Claims, 4 Drawing Sheets

(56) References Cited

U.S. PATENT DOCUMENTS

| | | | | |
|---|---|---|---|---|
| 2016/0033029 A1* | 2/2016 | Gerstenberger | ...... | F16H 57/045 475/160 |
| 2021/0372513 A1* | 12/2021 | Ohashi | ................ | F16H 57/0424 |

FOREIGN PATENT DOCUMENTS

| JP | 0854053 H | 2/1996 |
|---|---|---|
| JP | 2015212571 A | 11/2015 |
| JP | 2016160999 A | 9/2016 |
| JP | 2017166503 A | 9/2017 |

* cited by examiner

PASSIVE GEARBOX LUBRICATION SYSTEM WITH A SECONDARY SUMP

CROSS-REFERENCE TO RELATED APPLICATIONS

The present application claims the benefit of U.S. Provisional Application Ser. No. 63/315,321, entitled "PASSIVE LUBRICATION OF GEARBOX THAT REDUCES CHURNING LOSSES AT HIGHER OPERATING SPEEDS," filed on Mar. 1, 2022, the entire disclosure of which being expressly incorporated herein by reference.

FIELD OF TECHNOLOGY

The present disclosure relates generally to lubrication systems, such as gearbox lubrication systems. Disclosed embodiments include passive lubrication systems configured for reduced churning losses.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Passive lubrication systems are often utilized for lubricating components of a geared transmission system (e.g., a gearbox), such as bearings and gear meshes in a gearbox that may be configured, for example, to power to a vehicle from a motor or an engine of the vehicle. Passive lubrication systems typically include an oil sump that is positioned in the path of a gear wheel in the gearbox. Rotation of the gear wheel through the oil in the oil sump causes the oil to splash over components in the gearbox, thereby providing needed lubrication of the components in the gearbox. However, rotation of the gear wheel through the oil sump causes churning losses due to the resistance that the gear wheel experiences as the gear wheel moves through the oil in the oil sump. Thus, such passive lubrication systems are often inefficient, particularly at higher motors speeds. In some systems, active lubrication systems are employed to pump oil directly to locations where lubrication is needed in the gearbox, thus eliminating churning losses associated with gear wheel rotation through oil in an oil sump. However, while such active lubrication systems eliminate churning losses associated with passive lubrication systems, the active lubrication systems are costly. High costs associated with active lubrication systems makes active lubrication systems particularly unattractive for relatively smaller and/or simpler geared transmission systems, such as single speed geared transmission systems.

SUMMARY

According to some embodiments, a gearbox is provided. The gearbox comprises a housing and a first sump formed in the housing. The first sump for holding a lubricant fluid for lubricating one or more components of the gearbox. The gearbox also comprises a gear wheel configured to rotate through the lubricant fluid in the first sump. The gearbox additionally comprises a second sump formed in the housing, the second sump for capturing lubricant fluid displaced, by rotation of the gear wheel, from the first sump, the second sump having one or more openings for directing lubricant fluid captured in the second sump to the one or more components of the gearbox to provide lubrication to the one or more components of the gearbox. The gearbox further comprises a channel formed in the housing, the channel for channeling lubricant fluid, displaced by rotation of the gear wheel, from the first sump to the second sump.

In various embodiments, the second sump is positioned higher relative to the first sump in the housing. In certain embodiments, the gear wheel comprises helical gear teeth, and the channel comprises a taper facing a leading helix side of the helical gear teeth to funnel lubricant fluid, drained along the helical gear teeth, into the second sump. In some embodiments, the channel comprises a first opening providing a main entry point for the lubricant fluid into the second sump, and a second opening configured as a secondary entry point for channeling lubricant fluid into the second sump, the second entry point being lower in the channel relative to the first opening to allow lubricant fluid to enter the second sump without reaching the main entry point into the second sump.

In certain embodiments, the one or more openings for directing lubricant fluid captured in the second sump to the one or more components of the gearbox are located in a bottom portion of the second sump, and the second sump further comprises a deflector positioned in an upper portion of the second sump, the upper portion being higher in the housing that the bottom portion of the second sump, the deflector configured to deflect lubricant fluid, that enters the second sump in the upper portion, into the bottom portion of the second sump. In some embodiments, the one or more components of the gearbox include one or more bearings, and the gearbox further comprises one or more bearing cutouts in the gear wheel for channeling lubricant fluid that does not reach the second sump directly to one or more bearings in the gearbox. In certain embodiments, the second sump has a lower portion and an upper portion that is higher relative to the lower portion, the channel is configured to allow the lubricant fluid to enter the second sump in the lower portion of the second sump, and the one or more openings for directing lubricant fluid captured in the second sump to the one or more components of the gearbox are positioned in the lower portion of the second sump. In some embodiments, respective sizes of the one or more openings in the second sump are configured for optimized flow of the lubricant fluid from the second sump to the one or more gear components of the gearbox.

In some embodiments, the lubricant fluid is oil. In certain embodiments, the gearbox is a single speed gearbox. In some embodiments, the gearbox is part of a drive system.

According to further embodiments, a single speed drive system is provided. The single speed drive system includes an input gear shaft and a first gear wheel affixed to the input gear shaft. The single speed drive system also includes an output gear shaft and a second gear wheel affixed to the output gear shaft. The single speed drive system further includes a passive lubrication system comprising a first sump for holding a lubricant fluid for lubricating components of the single speed drive system, a second sump formed in the housing, the second sump for capturing lubricant fluid displaced, by rotation of the gear wheel, from the first sump, the second sump having one or more openings for directing lubricant fluid captured in the second sump to the one or more components of the single speed drive system to provide lubrication to the one or more components of the single speed drive system, and a channel formed in the housing, the channel for channeling lubricant fluid, displaced by rotation of the gear wheel, from the first sump to the second sump.

In various embodiments, the first sump is positioned at least partially in a path of rotation of the second gear wheel, and the second sump is positioned at least partially above the first gear wheel and the second gear wheel. In certain embodiments, each of the first gear wheel and the second gear wheel comprises helical gear teeth, and the channel comprises a taper facing a leading helix side of the helical gear teeth to direct lubricant, drained along the helical gear teeth, into the second sump. In some embodiments, the channel comprises a first opening providing a main entry point for the lubricant fluid into the second sump, and a second opening configured as a secondary entry point for channeling lubricant fluid into the second sump, the second entry point being lower in the channel relative to the first opening to allow lubricant fluid to enter the second sump without reaching the main entry point into the second sump. In some embodiments, the one or more openings one or more openings for directing lubricant fluid captured in the second sump to the one or more components of the single speed drive system are located in a bottom portion of the second sump, and the second sump further comprises a deflector positioned in an upper portion of the second sump, the upper portion being higher in the housing that the bottom portion of the second sump, the deflector configured to deflect lubricant fluid, that enters the second sump in the upper portion, into the bottom portion of the second sump.

In certain embodiments, the one or more components of the single speed drive system include one or more bearings, and the single speed drive system further comprises one or more bearing cutouts in the gear wheel for channeling lubricant fluid that does not reach the second sump directly to one or more bearings in the single speed drive system. In some embodiments, the second sump has a lower portion and an upper portion that is higher relative to the lower portion, the channel is configured to allow the lubricant fluid to enter the second sump in the lower portion of the second sump, and the one or more openings for directing lubricant fluid captured in the second sump to the one or more components of the single speed drive system are positioned in the lower portion of the second sump. In certain embodiments, respective sizes of the one or more openings for directing lubricant fluid captured in the second sump to the one or more components of the single speed drive system are configured for optimized flow of the lubricant fluid from the second sump to the one or more components of the single speed drive system.

DETAILED DESCRIPTION

Figure 1:
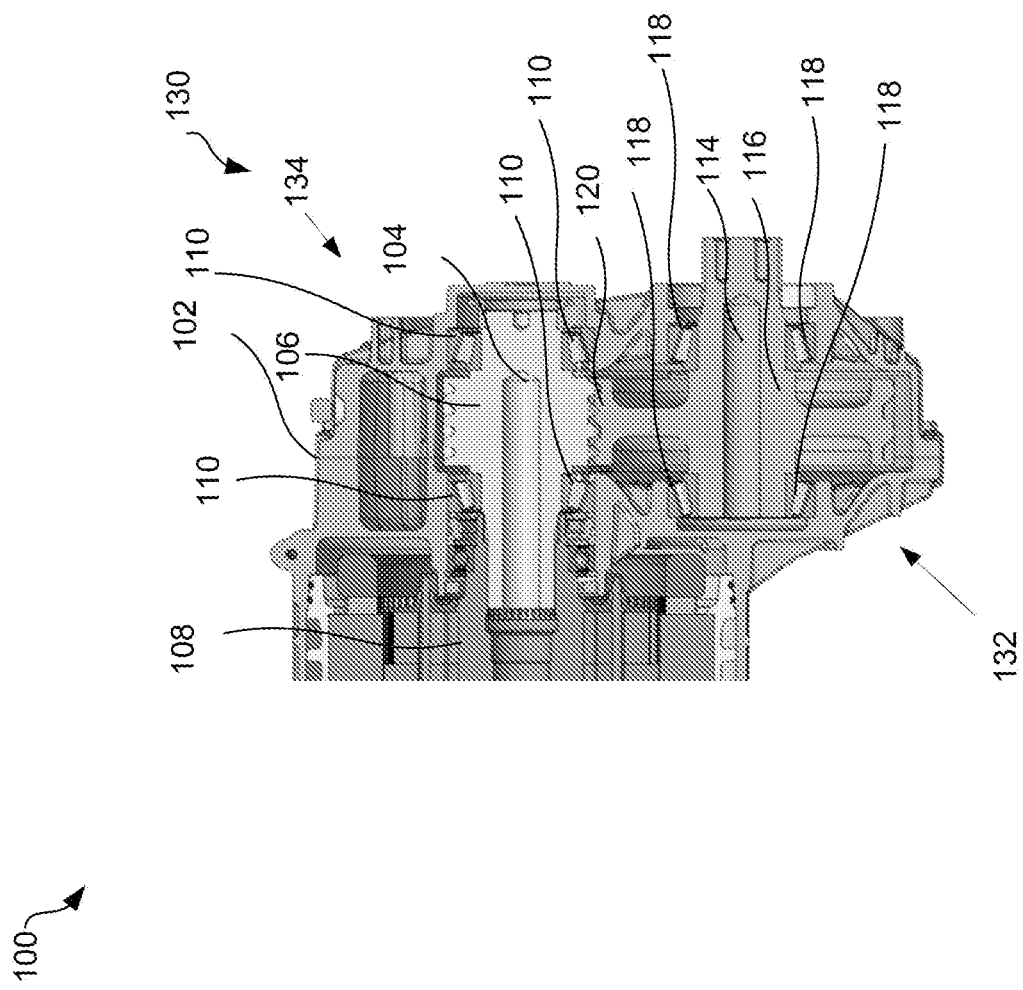
FIG. 1 is a cross sectional illustration of a motor system with passive gearbox lubrication, according to an embodiment.

In embodiments described below, a passive lubrication system that may be used for lubricating components of a gearbox comprises a first sump configured to hold lubricant fluid for lubricating components of the gearbox. The first sump may be positioned in a relatively lower portion of the gearbox and in the path of rotation of a gear wheel in the gearbox. The passive lubrication system additionally includes a second sump that may be positioned in a relatively higher portion of the gearbox, at least partially above the first sump and above the components that need lubrication in the gearbox. During operation, as lubricant fluid is displaced from the first sump by rotation of the gear wheel through the lubricant fluid contained in the first sump, the lubricant fluid may be channeled to the second sump via a channel that may be provided between the first sump and the second sump. The lubricant fluid thus captured in the second sump may be distributed to components (e.g., gear meshes, bearings, etc.) that need lubrication in the gearbox, by draining via openings (e.g., drillings) that may be strategically located in the second sump to direct lubricant fluid to locations of the components that need lubrication in the gearbox. Channeling lubricant fluid from the first sump to the second sump reduces the level of oil in the first sump, thereby reducing resistance and churning losses that may result from rotation of the gear wheel through the first sump, particularly at higher motor speeds. Moreover, channeling lubricant fluid from the first sump to the second sump, and distributing the lubricant fluid to components that need lubrication from the second sump, allows for a more targeted distribution of the lubricant fluid to lubricate components in the gearbox.

In embodiments, the channel between the first sump and the second sump may be a relatively narrow channel positioned in close proximity to the gear wheel that rotates through the lubricant fluid in the first sump. The channel may be formed, for example, with a relatively narrow space between gear teeth of the gear wheel and a housing that houses the gearbox. Such channel configuration may ensure that lubricant fluid picked up by the teeth of the gear wheel as the gear wheel rotates through the first sump is quickly channeled to the second sump, allowing the lubricant fluid to reach the second sump at relatively lower speeds of rotation of the gear wheel through the first sump. Consequently, lubricant fluid may begin filling the second sump, and begin draining from the second sump to locations that need lubrication in the gearbox, at relatively lower speeds of rotation of the gear wheel through the first sump. Moreover, in embodiments, quickly channeling lubricant fluid from the first sump to the second sump, at relatively lower speeds of rotation of the gear wheel through the first sump, ensures that the level of lubricant fluid in reduced in the first sump at lower speeds of rotation of the gear wheel though the first sump, with progressively greater reduction of the level of lubricant fluid in the first sump with increasing speeds of the gear wheel through the first sump. Quickly reducing the level of the lubricant fluid in the first sump, at relatively lower speeds of rotation of the gear wheel through the first sump, reduces or eliminates churning losses that may otherwise result from rotation of the gear wheel through the lubricant fluid in the first sump, particularly at relatively higher speeds of rotation of the gear wheel through the first sump, in at least some embodiments. In certain embodiments, the gear wheel comprises helical gear teeth, and the channel comprises a taper facing a leading helix side of the helical gear teeth to funnel lubricant fluid, drained along the helical gear teeth, into the second sump. In some embodiments, the channel comprises a first opening providing a main entry point for the lubricant fluid into the second sump, and a second opening configured as a secondary entry point for channeling lubricant fluid into the second sump, the second entry point being lower in the channel relative to the first opening to allow lubricant fluid to enter the second sump without reaching the main entry point into the second sump. These and other features of the passive lubrication system described herein may result in an increase of efficiency of the lubrication system in the gearbox, without added cost associated with active lubrication systems, in at least some embodiments.

FIG. 1 is a cross sectional illustration of a system 100 in which passive lubrication techniques described herein may be utilized, according to embodiments of the present disclosure. As just an example, the system 100 may be part of a drive system (e.g., a central drive system) that may be configured to convert rotation of a motor or an engine of a vehicle to energy for powering the vehicle. In embodiments, the system 100 is a single speed drive system that utilizes a single set of gears to convert rotation of the motor or engine of a vehicle to power for powering the vehicle. Although the passive lubrication techniques are described herein with reference to a single speed geared drive system coupled to a motor or engine of a vehicle for exemplary purposes, the passive lubrication techniques described herein may be utilized with multi-speed geared systems and/or may be utilized with other suitable geared transmission systems, in some embodiments. For example, the passive lubrication techniques described herein may be utilized with a gearbox that is part of a final drive system coupled to a wheel axle of a vehicle. In some embodiments, the passive lubrication techniques described herein may be utilized with geared systems other than geared drives in a vehicle.

The system 100 includes a gearbox 102 that, in turn, includes an input shaft 104 having a gear wheel 106 affixed thereto. The input shaft 104 may be rotatably coupled to a motor or engine 108 (generally referred to herein as "motor 108" for ease of explanation). The input shaft 104 may be supported in the gearbox 102 by a set of bearings 110 in the gearbox 102. The gearbox 102 also includes an output shaft 114 having a gear wheel 116 affixed thereto. The output shaft 114 may be configured to carry power from the motor 108 to the vehicle. The output shaft 114 may be supported in the gearbox 102 by a set of bearings 118. In operation, the input shaft 104 and, accordingly, the gear wheel 106, may rotate at a speed of rotation of the motor 108. The rotational motion of the input shaft 104 may be transferred to the output shaft 114 by engaging the gear wheel 116 that may mesh with the input gear 104 at a gear mesh 120 between the gear wheel 106 and the gear wheel 116. The rotational motion of the output shaft 114 may, in turn, be transferred to power for powering operation of the vehicle.

As will be explained in more detail below, in various embodiments, the gearbox 102 includes a passive lubrication system 130 having i) a primary sump that may be positioned in a lower portion 132 of the gearbox 102 such that lubricant fluid (e.g., oil) contained in the primary sump is in the path of rotation of the gear wheel 106 affixed to the output shaft 104 and ii) a secondary sump that may be positioned in an upper portion 134 of the gearbox 102, at least partially higher than the primary sump in the gearbox 102. In operation, with rotation of the motor 108 and consequent rotation of the gear wheel 116, lubricant fluid may be displaced from the primary sump by gear teeth of the gear wheel 116, and may be channeled into the secondary sump via a channel that may be provided between the primary sump and the secondary sump in the gearbox 102. Therefrom, lubricant fluid may be directed via openings (e.g., drillings) that may be provided in the secondary sump to components that need lubrication in the gearbox 102, such as the bearings 110, 118 and the gear mesh 120 between the gear wheel 106 and gear wheel 116. Subsequently, the lubricant fluid may return to the primary sump of the gearbox 102 by draining from the lubricated components into the primary sump of the gearbox 102.

In various embodiments, channeling lubricant fluid from the primary sump to the secondary sump results in a reduced level of lubricant fluid in the primary sump, thereby reducing resistance and churning losses that may result from rotation of the gear wheel 116 through the lubricant fluid in the primary sump, particularly at higher speeds of the motor 108. Moreover, channeling lubricant fluid from the primary sump to the secondary sump, and distributing the lubricant fluid to components that need lubrication from the secondary sump, allows for a more target distribution of lubricant fluid to the components that need lubrication in the gearbox 102 as compared to passive lubrication systems that do not distribute the lubricant fluid via a secondary sump.

In embodiments, the passive lubrication system 130 may be optimized such that lubricant fluid that is displaced from the primary sump reaches the secondary sump at relatively lower speeds of the motor 108. For example, placement and shape of the channel between the primary sump and the secondary sump, and placement and shape of the secondary sump, in the gearbox 102 may be optimized such that lubricant fluid flowing up the channel reaches and begins filling the secondary sump at relatively low speeds of the motor 108. The channel may be formed with a relatively narrow space between gear teeth of the gear wheel 116 and a housing of the gearbox 102. The channel may be configured such that lubricant fluid enters the secondary sump through an opening that may be provided in a lower portion (e.g., at the bottom) of the secondary sump. In embodiments, one or more additional openings may be provided in the channel at strategic locations and of strategic sizes to allow the lubricant fluid that accumulates in the channel to reach the secondary sump at relatively low speeds of the motor 108, before the lubricant fluid reaches the top of the channel. These and other channel and secondary sump configurations described herein ensure that lubricant fluid picked up by the teeth of the gear wheel 116 as the gear wheel 116 rotates through the primary sump is quickly channeled to the secondary sump and begins filling the secondary sump at relatively lower speeds of the motor 108 and, accordingly, relatively lower speeds of rotation of the gear wheel 116 through the primary sump. As a result, lubricant fluid may begin flowing from the secondary sump to locations of the bearings 110, 118 and the gear mesh 120 in the gearbox 102 at relatively lower speeds of the motor 108. Moreover, in embodiments, quickly channeling lubricant fluid from the primary sump to the secondary sump, an allowing lubricant fluid to begin filling the secondary sump at relatively lower speeds of rotation of the gear wheel 116 through the primary sump, ensures that the level of lubricant fluid in quickly reduced in the primary sump, with progressively greater reduction of the level of lubricant fluid in the primary sump with increasing speeds of the gear wheel 116 through the primary sump. Quickly reducing the level of the lubricant fluid in the primary sump, with reduction of level beginning at relatively lower speeds of rotation of the gear wheel 116 through the primary sump and progressing with increasing speeds of rotation of the gear wheel 116 through the primary sump, reduces or eliminates churning losses that may otherwise result from rotation of the gear wheel 116 through the lubricant fluid in the primary sump, particularly at relatively higher speeds of rotation of the gear wheel 116 through the primary sump, in at least some embodiments. In at least some embodiments, these and other features of the passive lubrication system 130 in the gearbox 102 may increase efficiently of lubrication in the gearbox 102 without requiring to actively pump lubricant fluid to components that need lubrication in the gearbox 102. Thus, cost of the gearbox 102 may be reduced compared to gearboxes that utilize active lubrication pumps, while still providing efficiency that may be not be achievable with conventional passive lubrication system, in at least some embodiments.

Figure 2:
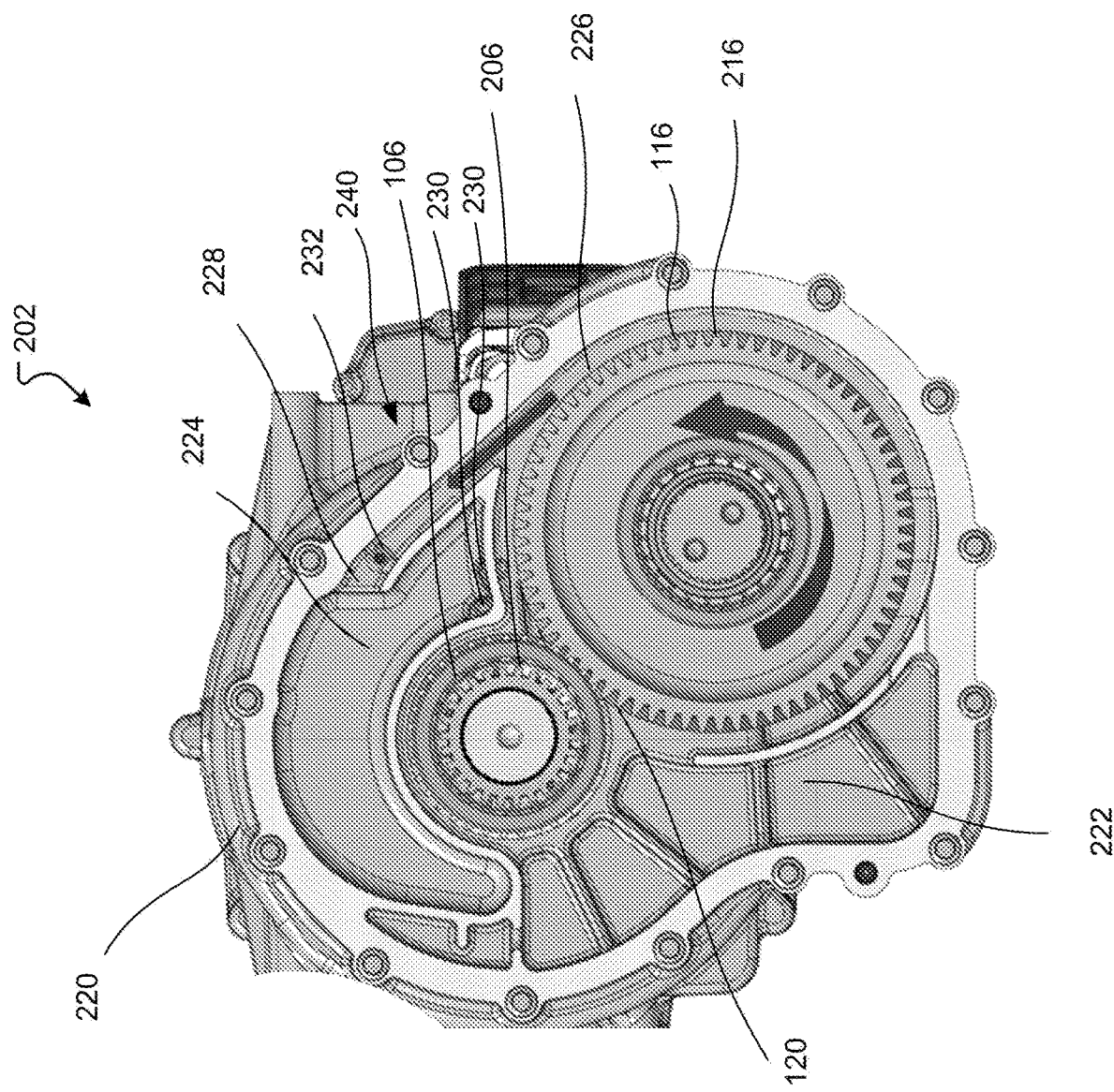
FIG. 2 is a cross section view of a gearbox having a primary and a secondary oil sump, according to an embodiment.

FIG. 2 is a cross sectional illustration showing detail of the gearbox 102 in accordance with embodiments of the present disclosure. FIG. 2 shows the gear wheel 106 having gear teeth 206 and the gear wheel 116 having teeth 216. In embodiments, the gear wheel 106 and the gear wheel 116 are helical gears. In these embodiments, the teeth 206 of the gear wheel 106 are oriented at an angle to the input shaft 104 and the teeth 216 of the gear wheel 116 are oriented at an angle to the output shaft 114. In other embodiments, suitable types of gears other than helical gears may be utilized.

The gearbox 102 is illustrated in FIG. 2 as having a housing 220. A primary sump 222 is formed in the housing 210 in a lower portion (e.g., portion 132 in FIG. 1) of the gearbox 102 such that a lubricant fluid (e.g., oil) contained in the primary sump 222 is in the path of rotation of the gear wheel 116. The lubricant fluid may be utilized for lubrication of various components of the gearbox 102, such as the bearings 110, 118 and the gear mesh 120 between the gear wheel 106 and gear wheel 116. For exemplary purposes, lubrication of the gearbox 102 is generally described herein with reference to the lubricant fluid being oil. However, suitable lubricant fluids other than oil may utilized in other embodiments.

With continued reference to FIG. 2, in an embodiment, a secondary sump 224 may be formed in the housing 220 in an upper portion (e.g., the portion 134 in FIG. 1) of the gearbox 102. A channel 226 may be formed in the housing 220 between the primary sump 222 and the secondary sump 224, to channel oil from the primary sump 222 to the secondary sump 224. In operation, when the vehicle is stationary and the motor 108 is at rest, oil may be contained in the primary sump 222. As the motor 108 begins rotating, the gear wheel 116 rotates through the oil in the primary sump 222, causing oil in the primary sump 222 to be lifted by the teeth 216 of the gear wheel 116. The oil lifted from the primary sump 222 is channeled into the channel 226 and begins flowing in the upwards direction, towards the secondary sump 224, in the channel 226. As the speed of the motor 108 increases, increasing amounts of oil are lifted by the teeth 216 of the gear wheel 116 and channeled into the channel 226, building pressure of oil flowing in the upward direction in the channel 226, towards the secondary sump 224, and preventing the oil from flowing in the downward direction in the channel 226. As more oil gets channeled from the primary sump 222 into the channel 226 and more pressure builds in the channel 226, oil begins to flow through an opening 228 that may be provided at the top of the channel 226 to allow oil to from the channel 226 to enter the secondary sump 224. In an embodiment, the secondary sump 224 may be maximally sized based on amount of space that is available for the secondary sump 224 to be suitably packaged with other components in the housing 220, to allow for maximal amounts of oil to be removed from the primary sump 222 and captured in the secondary sump 224, particularly at higher speeds of the motor 108.

In embodiments, openings (e.g., drillings) 230 may be provided in the secondary sump 224 to direct oil from the secondary sump 224 to locations of components that need lubrication in the gearbox 102, such as locations of the bearings 110, 118 and the gear mesh 120 in the gearbox 102. Thus, oil that flows into and accumulates in the secondary sump 224 may be drained from the secondary sump 224 in a controlled manner to provide lubrication to the components that need lubrication in the gearbox 102. Subsequently, the oil that lubricates the components in the gearbox 102 is drained back into the primary sump 222.

In various embodiments, the primary sump 222, secondary pump 224 and/or channel 226 are designed to ensure that i) oil reaches the secondary pump 224 at relatively low speeds of the motor 108 and ii) oil is quickly and efficiently directed from the secondary sump 224 to the desired locations in the gearbox 102. For example, the channel 226 may be a relatively narrow channel formed in the housing 220 with sufficiently small distance between the teeth 216 of the gear wheel 116 and a side of the housing 220 in the primary sump 222. Such size and location of the channel 226 may ensure that oil that is lifted by the teeth 216 of the gear wheel 116 is quickly channeled up the channel 226 towards the secondary sump 224. In some embodiments, the opening 228 may be configured as a main opening at the top of the channel 226 for allowing oil to enter from the channel 226 into the secondary sump 224, and one or more additional openings (e.g., slots) 232 may be provided in an upper portion of the channel 226, below the opening 228 at the top of the channel 226, to allow oil to begin flowing into the secondary sump 224 without reaching the opening 228, such as at speeds of the motor 108 that are not sufficiently high for the oil in the channel 226 to reach the opening 228. Sizes and locations of the one or more openings 232 in the channel 226 may be optimized such that sufficiently small amounts of oil are drained through the one or more openings 232 at lower motor speeds so as to build sufficiently high pressure in the channel 226 with increasing motor speeds to allow oil to be pushed passed the one or more openings 232 and flow into the secondary sump 224 through the opening 218. In embodiments, the opening 228 in the channel 226 is positioned such that oil enters the secondary sump 224 in a lower portion 240 of the secondary sump 224. Such positioning of the opening 228 ensures that oil begins filling the secondary sump 224 in the lower portion 240 that may provide the openings 230 for draining the oil from the secondary sump 224, so that oil may be more quickly directed to the desired locations for lubricating components of the in the gearbox 102.

Figure 3:
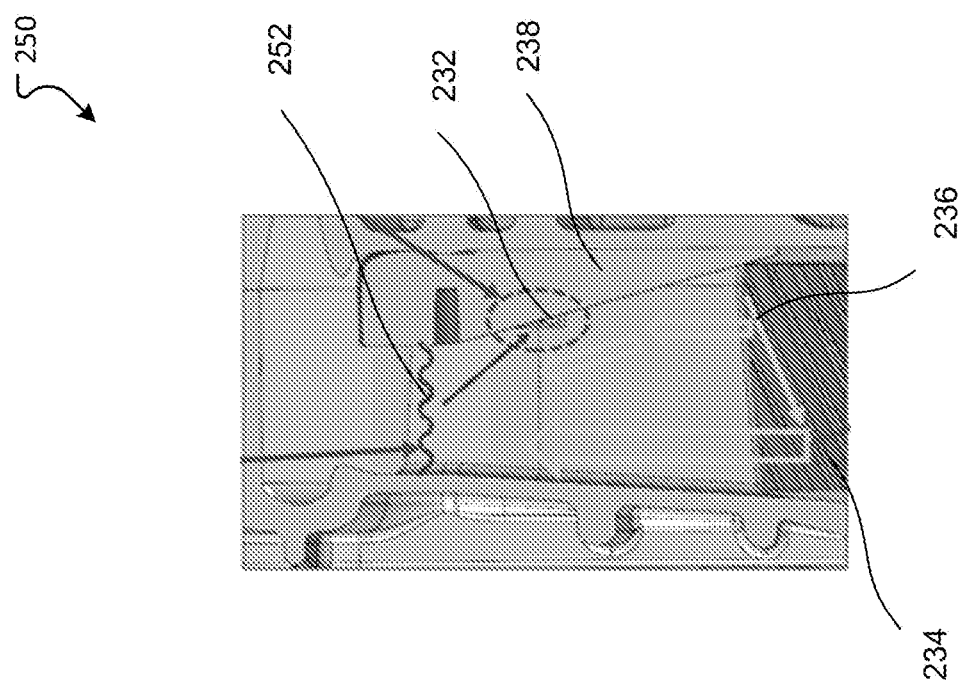
FIG. 3 is a view illustrating an exemplary channel for displacing oil from a primary sump to a secondary sump, according to an embodiment.

Referring to FIG. 3, a top portion 250 of the channel 226 having the opening 228 and a channel slot 232 arranged in accordance with an embodiment of the present disclosure is illustrated. FIG. 3 illustrates an oil level 252 that may be accumulating in the channel 226 at relatively lower speeds of the motor 108. As can be seen in FIG. 3, oil level 252 at relatively lower speeds of the motor 108 is below the opening 228 at the top of the channel 226. However, although oil level 252 is below the opening 228 at the top of the channel 226, oil may begin entering the secondary sump 224 through a channel slot 232 that may be provided in the channel 226.

Referring still to FIG. 3, in some embodiments, oil that is lifted from the primary sump 222 by a tooth 216 of the gear wheel 116 may not equally distributed along the width of the tooth 216, for example in embodiments in which the gears 104, 114 are helical gears having angled gear teeth 206, 216. In such embodiments, oil that is lifted by a tooth 216 may slide down the flank of the tooth 216, resulting in a relatively larger amount of oil at the trailing edge of the tooth 216. The relatively larger amount of oil at the trailing edges of the teeth 216, in turn, results in a relatively lager amount of oil being flung off from the trailing edges of the teeth 216 on a rear side 234 of the channel 226 as compared to the amount of oil flung at the leading edges of the teeth 216 on a front side 238 of the channel 226. In an embodiment, a channel taper 238 is provided at the front side of the channel 226, corresponding to the leading edge of the helix on the gear 116, to funnel the relatively smaller amounts of oil flung off the leading sides of gear teeth 220 into the secondary sump 224. By funneling the oil flung off the leading sides of gear teeth 220 into the secondary sump 224 may prevent oil from stagnating in the channel 226 and may reduce or eliminate deceleration of flow of oil in the channel 226 due to the unequal distribution of the oil across the face widths of the gear teeth 216, in at least some embodiments.

Figure 4:
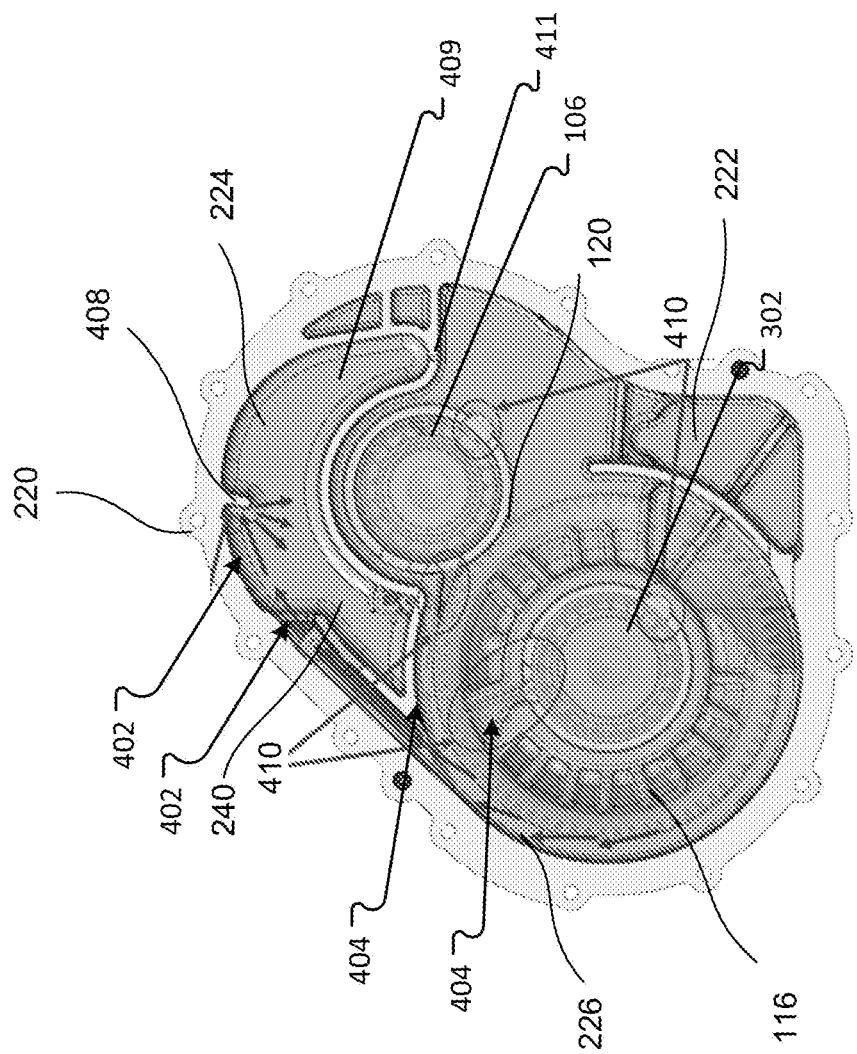
FIG. 4 is a diagram depicting flow of oil in a gearbox having a primary and a secondary oil sump, according to an embodiment.

FIG. 4 is another cross sectional illustration showing details of the gearbox 102 in accordance with embodiments of the present disclosure. FIG. 4 illustrates arrows 402 depicting flow of oil at higher speeds of the motor 108 and arrows 404 depicting flow of oil at lower speeds of the motor 108. In some embodiments, the secondary sump 224 may include a deflector 408 that may be formed in the housing 120 to deflect oil that is thrown (e.g., at relatively higher speeds of the motor 108) past the lower portion 240 of the secondary sump 224, and into an upper portion 250 that is relatively higher in the secondary sump 224 back towards the lower portion 240 so that the oil can be more quickly directed to the desired locations in the gearbox 102 through the openings 230 in the lower portion 240. Because the deflector 408 deflects oil to the lower portion 240, flow of oil received at the desired locations in the gearbox 102 may be maintained at a desired suitable high rate, in at least some embodiments. In embodiments, the shape of the secondary sump 224 may be such that the secondary sump 224 partially wraps around the gear wheel 106 and has a portion 409 that is on opposite side of the secondary sump 224 from the portion 240 at which oil enters the secondary sump 224. Such shape of the secondary sump 224 may provide a suitably large capacity of the secondary sump 224 so that a suitably large amount of oil may be captured in the secondary sump 224 as the gear wheel 116 rotates through the primary sump 222, reducing the level of oil in the primary sump 222 and thereby reducing or eliminating churning losses that may otherwise result from rotation of the gear wheel 116 through the oil in the primary sump 222. In some embodiments, an additional opening (e.g., drilling) 411 may be provided in the portion 409 of the secondary sump 224. The opening 411 in the portion 409 may be positioned at least substantially over at least a portion of the primary sump 222 and may allow oil captured in the portion 409 (e.g., at higher speeds of rotation of the gear wheel 116 through the primary sump 222) to drain back to the primary sump 222. As the gear wheel 116 continues rotation through the primary sump 222, the oil that is drained from the opening 411 in the secondary sump 224 to the primary sump 222 may be channeled back via the channel 226 to the secondary sump 224.

Referring still to FIG. 4, in embodiments, oil that does not reach the top of the channel 226 (e.g., at relatively lower speeds of the motor 108) is delivered by the gear wheel 116 to the gear mesh 120 between the gear wheel 116 and the gear wheel 106, thus providing lubrication of the gear mesh 120. In some embodiments, to provide lubrication of the bearings 110, 118 at the relatively lower speeds of the motor 108, at which there may not be sufficient amount of oil in the secondary sump 224, cut-outs or other outlets 410 may be provided in vicinity of one or both of the gear wheels 104, 106 to deliver oil that does not reach the top of the channel 226 to the bearings 110, 118.

Referring back to FIG. 2, in an embodiment, the number, placement and/or sizes of the openings 230 in secondary sump 224 may be determined to provide suitable or optimal lubrication to the components in the gearbox 102, such as bearings 110, 118 and gear mesh 120. In an example embodiment, five openings 230 may be provided: i) a first opening to direct oil to the gear mesh 120, ii) a second opening to direct oil to left hand side bearings 110 supporting the input shaft 104, iii) a third opening to direct oil to right hand side bearings 110 supporting the input shaft 104, iv) a fourth opening to direct oil to left hand side bearings 118 supporting the output shaft 114, and v) a fifth opening to direct oil to right hand side bearings 118 supporting the output shaft 114. The sizes (e.g., diameters of drillings) of the openings 230 may be determined to provide a desired rate of flow of oil through the openings 230. The sizes may be calculated using power loss calculations based on a desired rate of flow of oil through the openings 230, for example. In an example with five openings 230 as described above, the sizes may be as follows: i) the diameter of the first opening to direct oil to the gear mesh 120 may be at least approximately equal to 4 millimeters (mm), ii) the diameter of the second opening to direct oil to the left hand side bearings 110 supporting the input shaft 104 may be at least approximately equal to 6 mm, iii) the diameter of the third opening to direct oil to right hand side bearings 110 supporting the input shaft 104 may be at least approximately equal to 8 mm, iv) the diameter of the fourth opening to direct oil to the left hand side bearings 118 supporting the output shaft 114 may be at least approximately equal to 6 mm, and v) the diameter of the fifth opening to direct oil to the right hand side bearings 118 supporting the output shaft 114 may be at least approximately equal to 4 mm. Of course, these are just examples, and other suitable numbers, locations and/or sizes of the openings 230 are utilizes in other embodiments. Generally, efficiently channeling lubricant fluid from the primary sump 222 to the secondary sump 224, and providing a controlled manner of distributing (e.g., draining) the lubricant fluid from the secondary sump 224 to locations where lubrication is needed in the gearbox 102, results in reduction of churning losses while increasing efficiency of distributing lubricant fluid to desired locations in the gearbox 102, without requiring active elements, such as pumps, for distribution of lubricant fluid in the gearbox 102, in various embodiments.

It is to be understood that the above description is intended to be illustrative, and not restrictive. Many other embodiments will be apparent to those of skill in the art upon reading and understanding the above description. It is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A gearbox, comprising:
   a housing,
   a first sump formed in the housing, the first sump for holding a lubricant fluid for lubricating one or more components of the gearbox,
   a gear wheel configured to rotate through the lubricant fluid in the first sump, and a second sump formed in the housing, the second sump for capturing the lubricant fluid displaced, by rotation of the gear wheel, from the first sump, the second sump having one or more openings for directing the lubricant fluid captured in the second sump to the one or more components of the gearbox to provide lubrication to the one or more components of the gearbox, and a channel formed in the housing, the channel for channeling the lubricant fluid, displaced by rotation of the gear wheel, from the first sump to the second sump;

wherein the channel further comprises:
  a first opening providing a main entry point for the lubricant fluid into the second sump, and
  a second opening configured as a secondary entry point for channeling the lubricant fluid into the second sump, the second entry point being lower in the channel relative to the first opening to allow the lubricant fluid to enter the second sump without reaching the main entry point into the second sump.

2. The gearbox of claim 1, wherein the second sump is positioned higher relative to the first sump in the housing.

3. The gearbox of claim 1, wherein the gear wheel comprises helical gear teeth.

4. The gearbox of claim 3, wherein the channel comprises a taper facing a leading helix side of the helical gear teeth to funnel the lubricant fluid, drained along the helical gear teeth, into the second sump.

5. The gearbox of claim 1, wherein
the one or more openings for directing the lubricant fluid captured in the second sump to the one or more components of the gearbox are located in a bottom portion of the second sump, and
the second sump further comprises a deflector positioned in an upper portion of the second sump, the upper portion being higher in the housing that the bottom portion of the second sump, the deflector configured to deflect the lubricant fluid, that enters the second sump in the upper portion, into the bottom portion of the second sump.

6. The gearbox of claim 1, wherein
the one or more components of the gearbox include one or more bearings, and
the gearbox further comprises one or more bearing cutouts in the gear wheel for channeling the lubricant fluid that does not reach the second sump directly to the one or more bearings in the gearbox.

7. The gearbox of claim 1, wherein
the second sump has a lower portion and an upper portion that is higher relative to the lower portion,
the channel is configured to allow the lubricant fluid to enter the second sump in the lower portion of the second sump, and
the one or more openings for directing the lubricant fluid captured in the second sump to the one or more components of the gearbox are positioned in the lower portion of the second sump.

8. The gearbox of claim 7, wherein respective sizes of the one or more openings in the second sump are configured for optimized flow of the lubricant fluid from the second sump to the one or more gear components of the gearbox.

9. The gearbox of claim 1, wherein the lubricant fluid is oil.

10. The gearbox of claim 1, wherein the gearbox is a single speed gearbox.

11. A vehicle drive system comprising the gearbox of claim 1.

12. A single speed drive system, comprising:
an input gear shaft;
a first gear wheel affixed to the input gear shaft;
an output gear shaft;
a second gear wheel affixed to the output gear shaft; and
a passive lubrication system including:
  a first sump for holding a lubricant fluid for lubricating components of the single speed drive system,
  a second sump formed in a housing, the second sump for capturing the lubricant fluid displaced, by rotation of the second gear wheel, from the first sump, the second sump having one or more openings for directing the lubricant fluid captured in the second sump to one or more components of the single speed drive system to provide lubrication to the one or more components of the single speed drive system, and
  a channel formed in the housing, the channel for channeling the lubricant fluid, displaced by rotation of the second gear wheel, from the first sump to the second sump;
wherein the channel further comprises:
  a first opening providing a main entry point for the lubricant fluid into the second sump, and
  a second opening configured as a secondary entry point for channeling the lubricant fluid into the second sump, the second entry point being lower in the channel relative to the first opening to allow the lubricant fluid to enter the second sump without reaching the main entry point into the second sump.

13. The single speed drive system of claim 12, wherein
the first sump is positioned at least partially in a path of rotation of the second gear wheel, and
the second sump is positioned at least partially above the first gear wheel and the second gear wheel.

14. The single speed drive system of claim 12, wherein each of the first gear wheel and the second gear wheel comprises helical gear teeth.

15. The single speed drive system of claim 14, wherein the channel comprises a taper facing a leading helix side of the helical gear teeth to direct the lubricant fluid, drained along the helical gear teeth, into the second sump.

16. The single speed drive system of claim 12, wherein
the one or more openings for directing the lubricant fluid captured in the second sump to the one or more components of the single speed drive system are located in a bottom portion of the second sump, and
the second sump further comprises a deflector positioned in an upper portion of the second sump, the upper portion being higher in the housing that the bottom portion of the second sump, the deflector configured to deflect the lubricant fluid, that enters the second sump in the upper portion, into the bottom portion of the second sump.

17. The single speed drive system of claim 12, wherein
the one or more components of the single speed drive system include one or more bearings, and
the single speed drive system further comprises one or more bearing cutouts in the second gear wheel for channeling the lubricant fluid that does not reach the second sump directly to the one or more bearings in the single speed drive system.

18. The single speed drive system of claim 12, wherein
the second sump has a lower portion and an upper portion that is higher relative to the lower portion, the channel is configured to allow the lubricant fluid to enter the second sump in the lower portion of the second sump, and the one or more openings for directing the lubricant fluid captured in the second sump to the one or more components of the single speed drive system are positioned in the lower portion of the second sump, wherein respective sizes of the one or more openings for directing the lubricant fluid captured in the second sump to the one or more components of the single speed drive system are configured for optimized flow of the lubricant fluid from the second sump to the one or more components of the single speed drive system.

19. A gearbox, comprising:

a housing, a first sump formed in the housing, the first sump for holding a lubricant fluid for lubricating one or more components of the gearbox, a gear wheel configured to rotate through the lubricant fluid in the first sump, and a second sump formed in the housing, the second sump for capturing the lubricant fluid displaced, by rotation of the gear wheel, from the first sump, the second sump having one or more openings for directing the lubricant fluid captured in the second sump to the one or more components of the gearbox to provide lubrication to the one or more components of the gearbox, and a channel formed in the housing, the channel for channeling the lubricant fluid, displaced by rotation of the gear wheel, from the first sump to the second sump;

wherein the one or more openings for directing the lubricant fluid captured in the second sump to the one or more components of the gearbox are located in a bottom portion of the second sump; and wherein the second sump further comprises a deflector positioned in an upper portion of the second sump, the upper portion being higher in the housing that the bottom portion of the second sump, the deflector configured to deflect the lubricant fluid, that enters the second sump in the upper portion, into the bottom portion of the second sump.

20. A gearbox, comprising:

a housing, a first sump formed in the housing, the first sump for holding a lubricant fluid for lubricating one or more components of the gearbox, a gear wheel configured to rotate through the lubricant fluid in the first sump, and a second sump formed in the housing, the second sump for capturing the lubricant fluid displaced, by rotation of the gear wheel, from the first sump, the second sump having one or more openings for directing the lubricant fluid captured in the second sump to the one or more components of the gearbox to provide lubrication to the one or more components of the gearbox, and a channel formed in the housing, the channel for channeling the lubricant fluid, displaced by rotation of the gear wheel, from the first sump to the second sump;

wherein the one or more components of the gearbox include one or more bearings; and wherein the gearbox further comprises one or more bearing cutouts in the gear wheel for channeling the lubricant fluid that does not reach the second sump directly to the one or more bearings in the gearbox.

\* \* \* \* \*